(12) United States Patent
Yoo

(10) Patent No.: US 12,298,162 B2
(45) Date of Patent: May 13, 2025

(54) ULTRASONIC FLOW METER

(71) Applicant: IS TECHNOLOGIES CO., LTD., Incheon (KR)

(72) Inventor: Na Kyoung Yoo, Incheon (KR)

(73) Assignee: IS TECHNOLOGIES CO., LTD., Incheon (KR)

( * ) Notice: Subject to any disclaimer, the term of this patent is extended or adjusted under 35 U.S.C. 154(b) by 183 days.

(21) Appl. No.: 17/988,068

(22) Filed: Nov. 16, 2022

(65) Prior Publication Data
US 2023/0194319 A1   Jun. 22, 2023

(30) Foreign Application Priority Data

Nov. 19, 2021 (KR) .......................... 10-2021-0160607
Oct. 26, 2022 (KR) .......................... 10-2022-0139124

(51) Int. Cl.
*G01F 1/667* (2022.01)
(52) U.S. Cl.
CPC .................................. *G01F 1/667* (2013.01)
(58) Field of Classification Search
CPC ........ G01F 1/667; G01F 15/00; G01F 15/185; G01F 1/662; G01F 1/666
See application file for complete search history.

(56) References Cited

U.S. PATENT DOCUMENTS

| | | | | |
|---|---|---|---|---|
| 2014/0318268 A1* | 10/2014 | Sorensen | ............... | G01P 5/245 73/861.27 |
| 2018/0306617 A1* | 10/2018 | Bonomi | ................. | G01F 1/662 |
| 2021/0325216 A1* | 10/2021 | Shen | ....................... | G01F 1/662 |

FOREIGN PATENT DOCUMENTS

| | | |
|---|---|---|
| EP | 2423648 A1 | 2/2012 |
| JP | H10274551 A | 10/1998 |
| JP | 2015-014568 A | 1/2015 |
| KR | 101576771 B1 | 12/2015 |
| KR | 102189806 B1 | 12/2020 |
| WO | 2018174121 A1 | 9/2018 |

* cited by examiner

*Primary Examiner* — Xin Y Zhong
(74) *Attorney, Agent, or Firm* — Best & Flanagan LLP

(57) ABSTRACT

Disclosed is an ultrasonic flow meter configured to measure the flow rate of a fluid using ultrasonic waves, wherein branch flow paths are formed in a flow path in order to regularly reduce the sectional area of the flow path over at least a predetermined distance between reflectors such that the flow speed of the fluid in the flow path between the reflectors is increased without pressure loss, whereby it is possible to improve measurement accuracy.

15 Claims, 12 Drawing Sheets

A-A

ULTRASONIC FLOW METER

This application claims the benefit of Korean Patent Application No. 10-2021-0160607, filed on Nov. 19, 2021, and Korean Patent Application No. 10-2022-0139124, filed on Oct. 26, 2022, which are hereby incorporated by reference as if fully set forth herein.

BACKGROUND OF THE INVENTION

Field of the Invention

The present invention relates to an ultrasonic flow meter configured to measure the flow rate of a fluid (water or oil) using ultrasonic waves.

Discussion of the Related Art

A flow meter, which is configured to measure the flow rate of a fluid, is classified as a differential pressure flow meter using Bernoulli's theorem, an electromagnetic flow meter using Faraday's law, or an ultrasonic flow meter using a Doppler method and a time difference method.

Since an ultrasonic sensor is installed outside a pipe, it is easy to install and maintain the ultrasonic flow meter. In addition, since there is no device that disturbs the flow of a fluid in the pipe, no pressure loss occurs, a measurable flow rate range is wide, and accuracy is high.

In general, the speed of a sound wave in a flow direction of a fluid is higher than the speed of the sound wave in a direction opposite the flow direction of the fluid. Consequently, ultrasonic waves may be oscillated from a pair of ultrasonic transducers spaced apart from each other by a predetermined distance in the flow direction of the fluid in order to measure the propagation speed of the ultrasonic waves in the flow direction of the fluid and the propagation speed of the ultrasonic waves in the direction opposite the flow direction of the fluid, and the difference between the measured propagation speeds of the ultrasonic waves may be compared to each other in order to calculate the speed of the fluid. In particular, the sectional area of a pipe in which the fluid flows may be multiplied by the speed of the fluid in order to calculate the flow rate of the fluid.

When the flow speed of the fluid flowing in the pipe is high, the ultrasonic flow meter may accurately measure the flow rate of the fluid. When the flow speed of the fluid is low, however, an error in flow rate measurement occurs, since the difference between the propagation speed of the ultrasonic waves in the flow direction of the fluid and the propagation speed of the ultrasonic waves in the direction opposite the flow direction of the fluid is extremely small.

In order to solve this problem, an ultrasonic flow meter disclosed in EP 10174660 B1 is configured such that the diameter of a flow channel FC is gradually reduced toward the middle thereof, as shown in FIG. 12. When the flow speed of the fluid is increased, therefore, pressure loss occurs, whereby an error in flow rate measurement occurs. Therefore, there is a need to provide a method capable of solving this problem.

The above information disclosed in this Background section is provided only for enhancement of understanding of the background of the invention and therefore it may contain information that does not form the prior art that is already known in this country to a person of ordinary skill in the art.

PRIOR ART DOCUMENTS

Patent Documents (Patent Document 1) EP 10174660 B1
(Patent Document 2) KR 10-2189806 B1

SUMMARY OF THE INVENTION

Accordingly, the present invention is directed to an ultrasonic flow meter that substantially obviates one or more problems due to limitations and disadvantages of the related art.

It is an object of the present invention to provide a new ultrasonic flow meter configured to have a structure in which an inner flow path is provided in a main flow path and a plurality of plates is formed around the inner flow path such that, when the flow speed is low, a fluid is stagnant in spaces between the plates due to surface tension of the fluid, whereby the flow speed of the fluid flowing in the inner flow path is increased, and therefore accuracy in ultrasonic flow rate measurement is improved.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an ultrasonic flow meter includes a measurement tube having formed therein a main flow path configured to allow a fluid to flow therein, the measurement tube having a first sensor hole and a second sensor hole, an ultrasonic sensor module including a first ultrasonic transducer installed in the first sensor hole and a second ultrasonic transducer installed in the second sensor hole, a first reflector and a second reflector installed in the measurement tube so as to correspond to the first sensor hole and the second sensor hole, respectively, an inner tube located at the center of the main flow path, the inner tube having formed therein a central flow path configured to allow movement of ultrasonic waves therethrough, and a flow path sectional area reduction member configured to reduce the sectional area of the main flow path over at least a predetermined distance in an extension direction of the main flow path between the first reflector and the second reflector, the flow path sectional area reduction member comprising a plurality of plates disposed such that a plurality of branch flow paths is formed around the inner tube.

In at least one embodiment of the present invention, the measurement tube may include a middle tube having the main flow path defined therein, a first tube coupled to one side of the middle tube, the first tube having formed therein a first flow path connected to the main flow path, the first tube being provided in an outer surface thereof with a first sensor hole communicating with the first flow path, and a second tube coupled to the other side of the middle tube, the second tube having formed therein a second flow path connected to the main flow path, the second tube being provided in an outer surface thereof with a second sensor hole communicating with the second flow path.

In at least one embodiment of the present invention, the plurality of plates may connect an outer surface of the inner tube and an inner surface of the middle tube to each other.

In at least one embodiment of the present invention, the plurality of plates may be disposed in a second direction perpendicular to the extension direction of the main flow path.

In at least one embodiment of the present invention, the plurality of plates may be configured such that the sectional width of each of the plurality of plates is gradually decreased from an inner surface of the middle tube to the inner tube.

In at least one embodiment of the present invention, both ends of each of the plurality of plates in a longitudinal direction may be rounded.

In at least one embodiment of the present invention, each of the first and second reflectors may include a reflecting portion, burying portions formed at opposite sides of the reflecting portion, and a plurality of connecting portions configured to connect the reflecting portion and the burying portions to each other.

In at least one embodiment of the present invention, each of the burying portions may have the same curvature as the circumference of the section of a corresponding one of the first tube and the second tube when the reflectors are located inclined at a predetermined angle in the first tube and the second tube.

In at least one embodiment of the present invention, the burying portions of each of the first and second reflectors may be located in a corresponding one of the first tube and the second tube by insert injection molding.

In at least one embodiment of the present invention, each of the plurality of plates may be curved.

In at least one embodiment of the present invention, the middle tube may be provided at each of outer surfaces of opposite sides thereof in the longitudinal direction with at least one hook, and each of the first and second tubes may be provided at one side thereof with a hook hole configured to allow the hook to be coupled thereto.

In at least one embodiment of the present invention, each of the first and second tubes may be provided at opposite sides of the hook hole thereof with incision recesses extending in the longitudinal direction.

In at least one embodiment of the present invention, the first tube and the second tube may be provided at sides thereof opposite the first and second sensor holes with first and second pressure loss reduction holes, respectively.

In at least one embodiment of the present invention, the plurality of plates may be radially disposed between the inner tube and the middle tube.

In at least one embodiment of the present invention, the plurality of branch flow paths may be configured such that, when the flow speed of the fluid introduced into the measurement tube is a value between 34.05 and 1000 mm/s, the Reynolds number in each of the branch flow paths is 2100.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
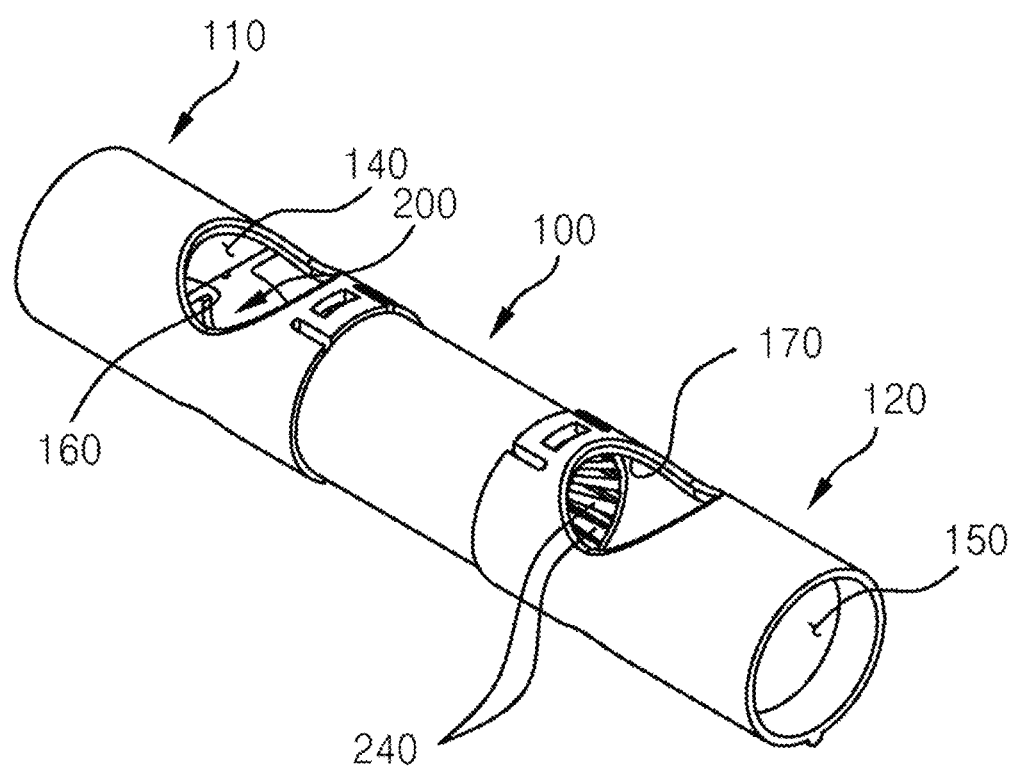
FIG. 1 is a view showing an ultrasonic flow meter according to an embodiment of the present invention.

The present invention may be changed in various manners and may have various embodiments, wherein specific embodiments will be described with reference to the drawings. However, the present invention is not limited to the specific embodiments, and it should be understood that the present invention includes all modifications, equivalents, or substitutions included in the idea and technical scope of the present invention.

Although terms including ordinal numbers, such as "first" and "second," may be used herein to describe various components, these components should not be limited by these terms. These terms are only used to distinguish one component from another component.

The term "and/or" includes any and all combinations of one or more of the associated listed items. For example, "A and/or B" includes "A", "B", and "A and B".

It should be understood that, when a component is referred to as being "connected to" or "coupled to" another component, it may be directly connected to or coupled to another component or intervening components may be present. In contrast, it should be understood that, when a component is referred to as being "directly connected to" or "directly coupled to" another component, there are no intervening components present.

In the following description of the embodiments, it will be understood that, when an element, such as a layer (film), a region, a pattern, or a structure, is referred to as being "on" or "under" another element, such as a substrate, a layer (film), a region, a pad, or a pattern, it can be "directly" on or under another element or can be "indirectly" formed such that an intervening element is also present. Terms such as "on" or "under" are described on the basis of the drawings, and are used to show relative positions between components for the sake of convenience, rather than to define actual positions of the components. For example, "B above A" indicates merely that B is shown as being on A in the drawings, unless mentioned otherwise or unless A must be located above B due to attributes of A and B. Actually, B may be located under A, or B and A may be disposed side by side.

Also, in the drawings, the thickness or size of a layer (film), a region, a pattern, or a structure may be changed for convenience of description and clarity, and therefore the size thereof does not entirely reflect the actual size thereof.

The terms used in the present application are provided only to described specific embodiments, and do not limit the present invention. Singular forms are intended to include plural forms well, unless the context clearly indicates otherwise. In the present application, it should be understood that the terms "includes," "has," etc. specify the presence of stated features, numbers, steps, operations, elements, components, or combinations thereof, but do not preclude the presence or addition of one or more other features, numbers, steps, operations, elements, components, or combinations thereof.

All terms, including technical and scientific terms, have the same meanings as those commonly understood by one of ordinary skill in the art to which this disclosure pertains, unless otherwise defined. Commonly used terms, such as those defined in typical dictionaries, should be interpreted as being consistent with the contextual meaning of the relevant art, and are not to be construed in an ideal or overly formal sense unless expressly defined to the contrary.

Hereinafter, embodiments will be described in detail with reference to the accompanying drawings, and the same or similar elements are denoted by the same reference numerals even though they are depicted in different drawings and redundant description thereof will be omitted.

Figure 2:
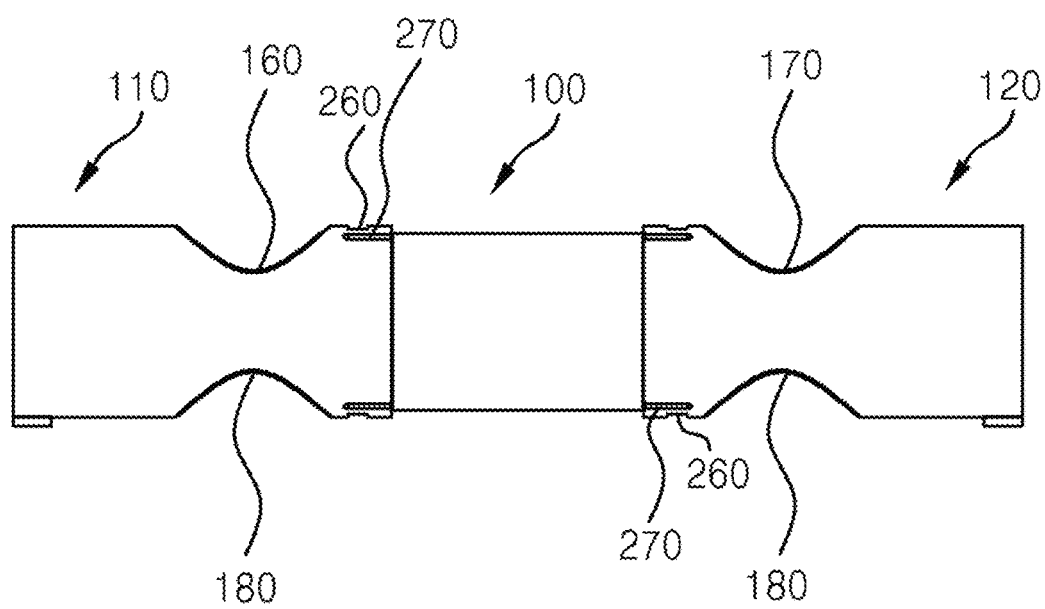
FIG. 2 is a side view of the ultrasonic flow meter according to the embodiment of the present invention.
Figure 3:
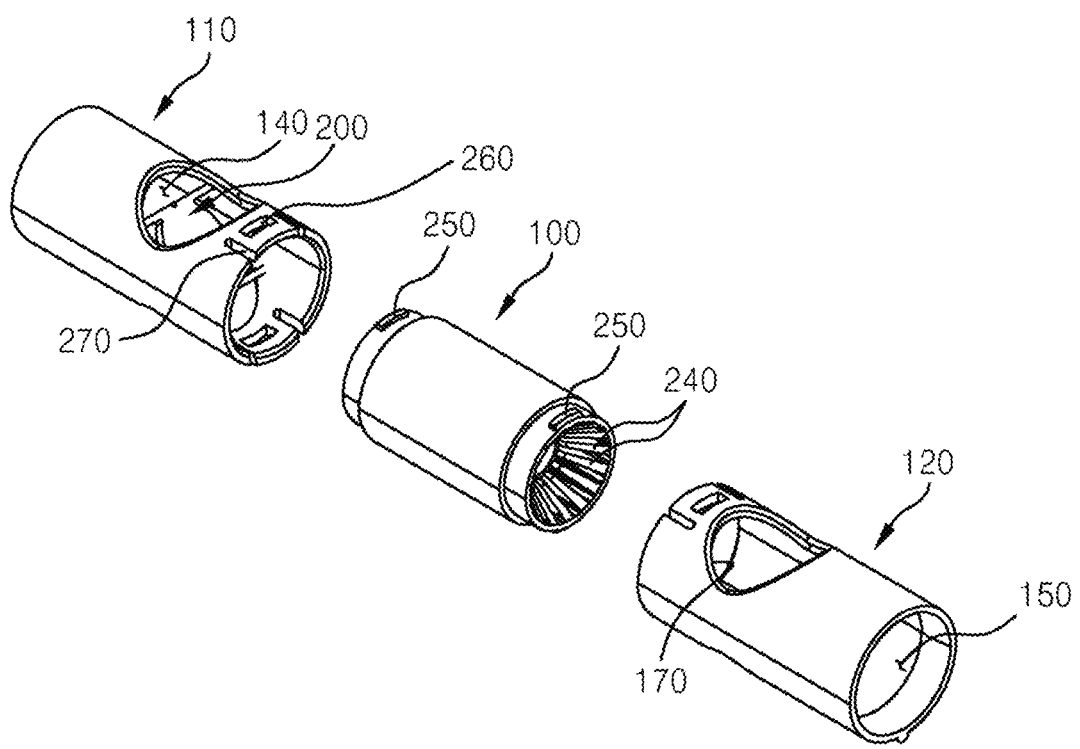
FIG. 3 is a view showing the state in which a middle tube is separated from first and second tubes in the ultrasonic flow meter according to the embodiment of the present invention.

FIG. 1 is a view showing an ultrasonic flow meter according to an embodiment of the present invention, FIG. 2 is a side view of the ultrasonic flow meter according to the embodiment of the present invention, and FIG. 3 is a view showing the state in which a middle tube is separated from first and second tubes in the ultrasonic flow meter according to the embodiment of the present invention.

Figure 4:
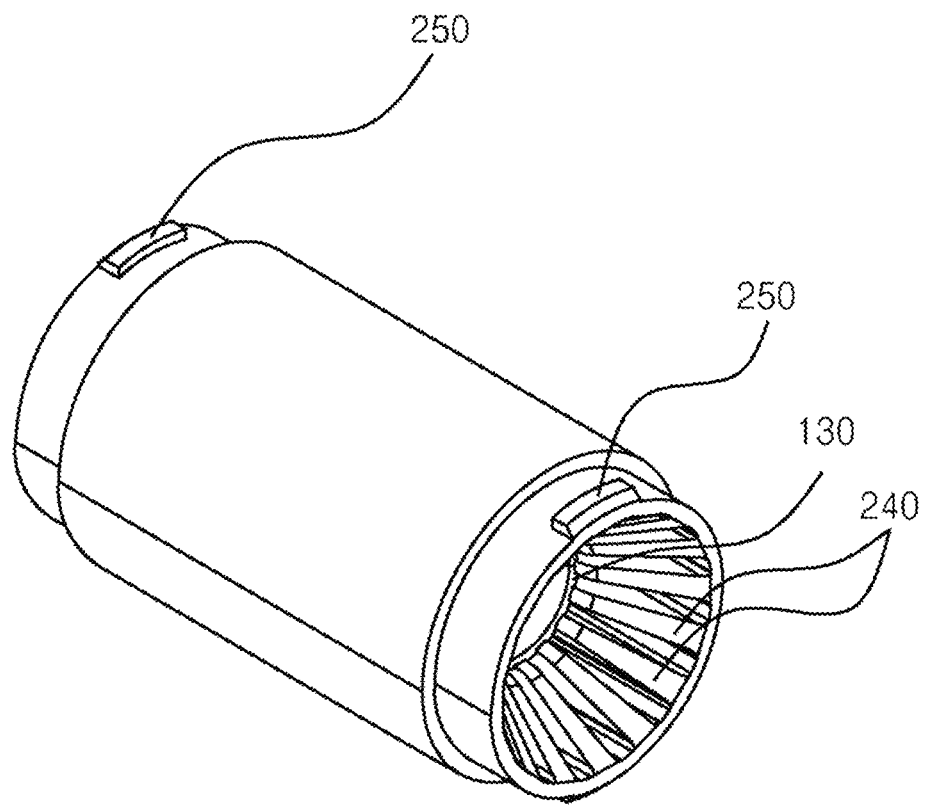
FIG. 4 is a view showing a middle tube in an ultrasonic flow meter according to a first embodiment of the present invention.
Figure 5:
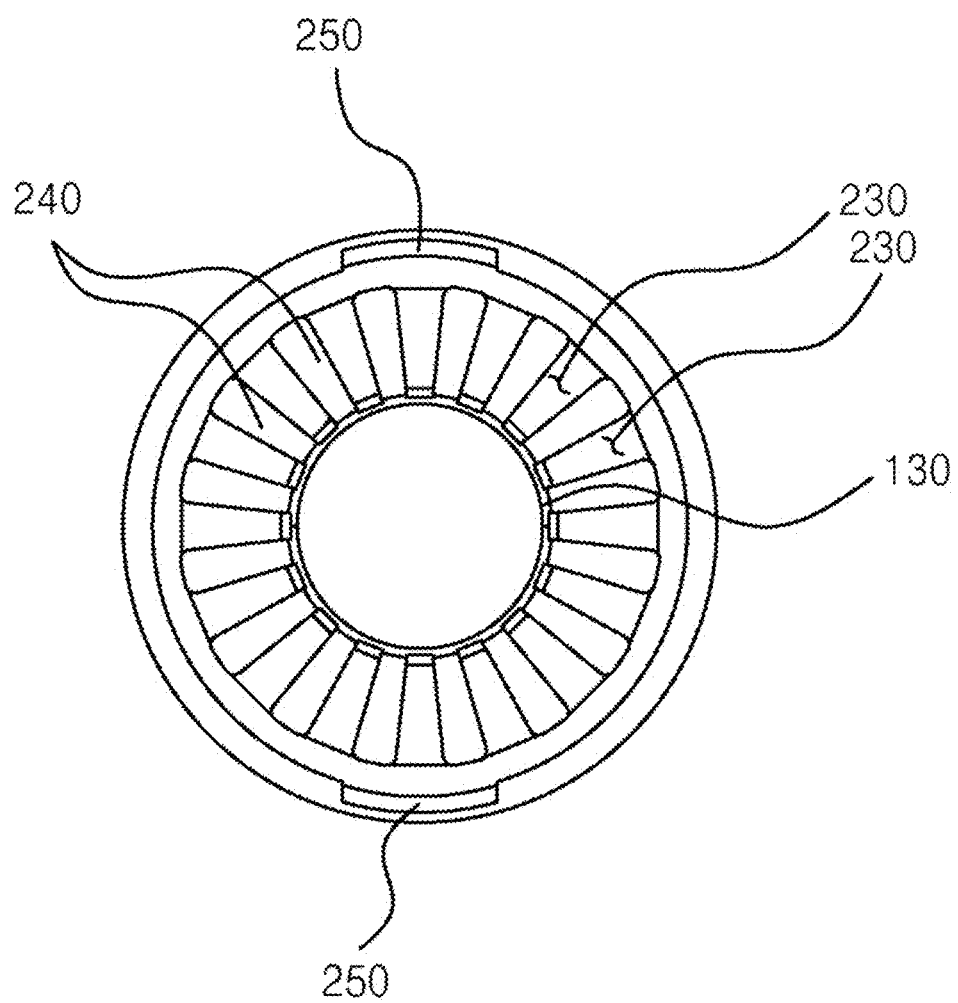
FIG. 5 is a front view of the middle tube in the ultrasonic flow meter according to the first embodiment of the present invention.
Figure 6:
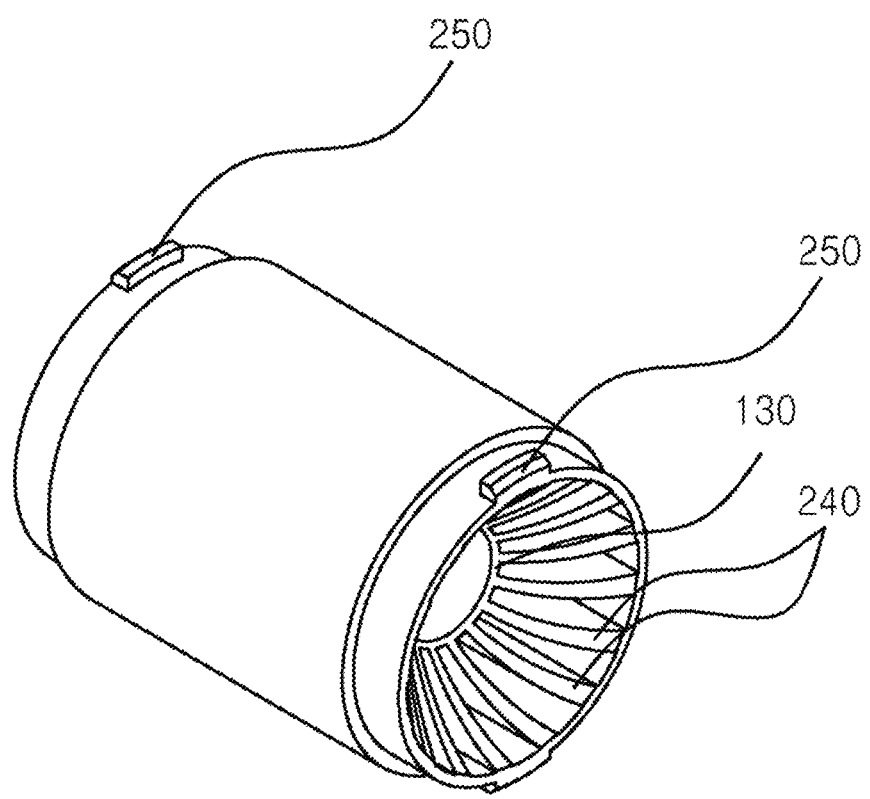
FIG. 6 is a view showing a middle tube in an ultrasonic flow meter according to a second embodiment of the present invention.

FIG. 4 is a view showing a middle tube in an ultrasonic flow meter according to a first embodiment of the present invention, FIG. 5 is a front view of the middle tube in the ultrasonic flow meter according to the first embodiment of the present invention, and FIG. 6 is a view showing a middle tube in an ultrasonic flow meter according to a second embodiment of the present invention.

Figure 7:
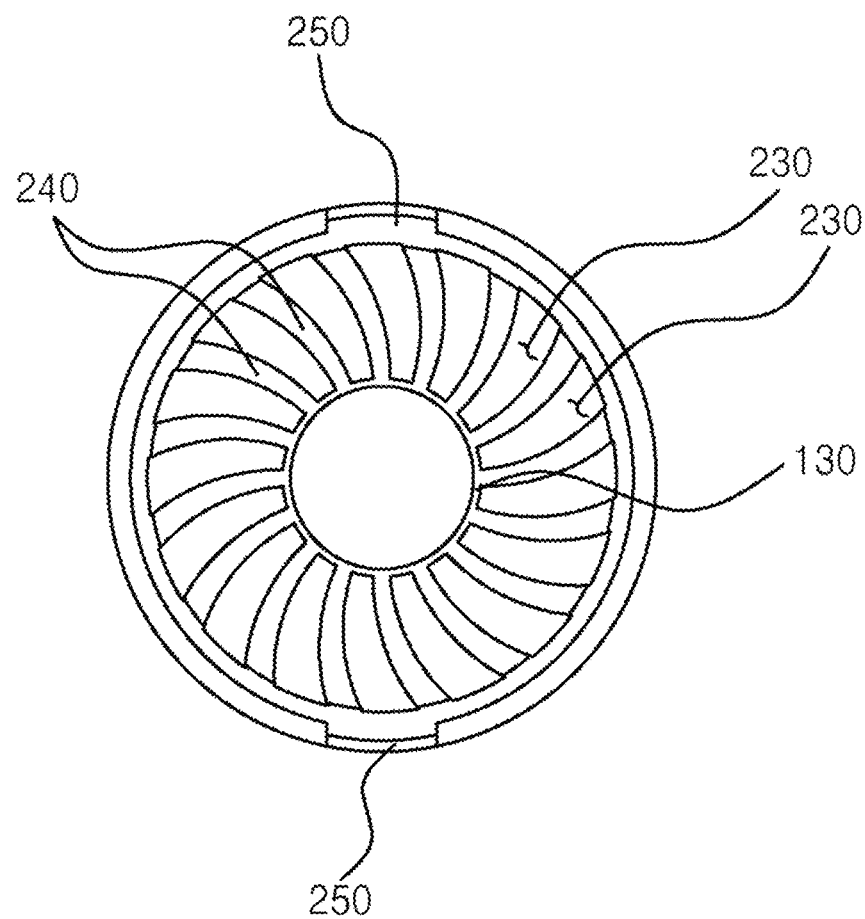
FIG. 7 is a front view of the middle tube in the ultrasonic flow meter according to the second embodiment of the present invention.
Figure 8:
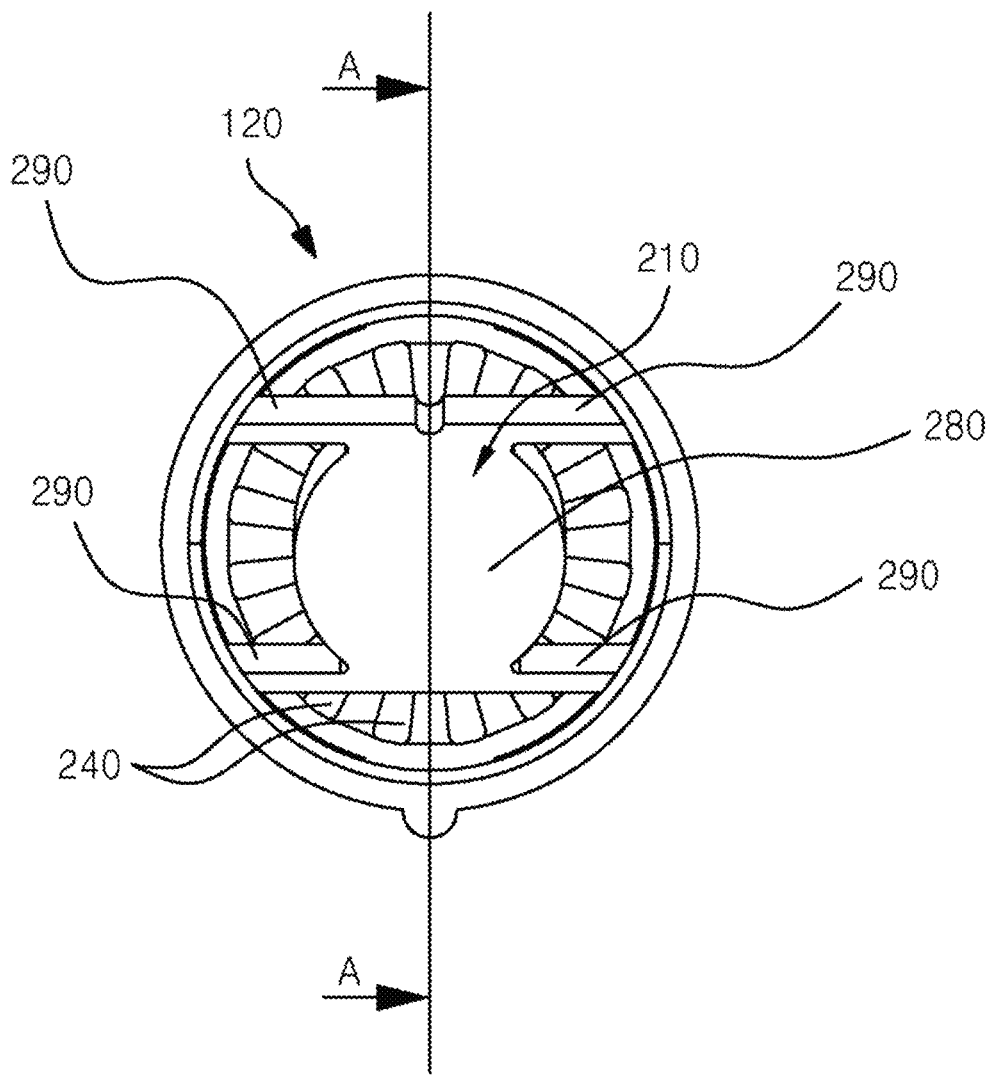
FIG. 8 is a front view of the ultrasonic flow meter according to the embodiment of the present invention.
Figure 9:
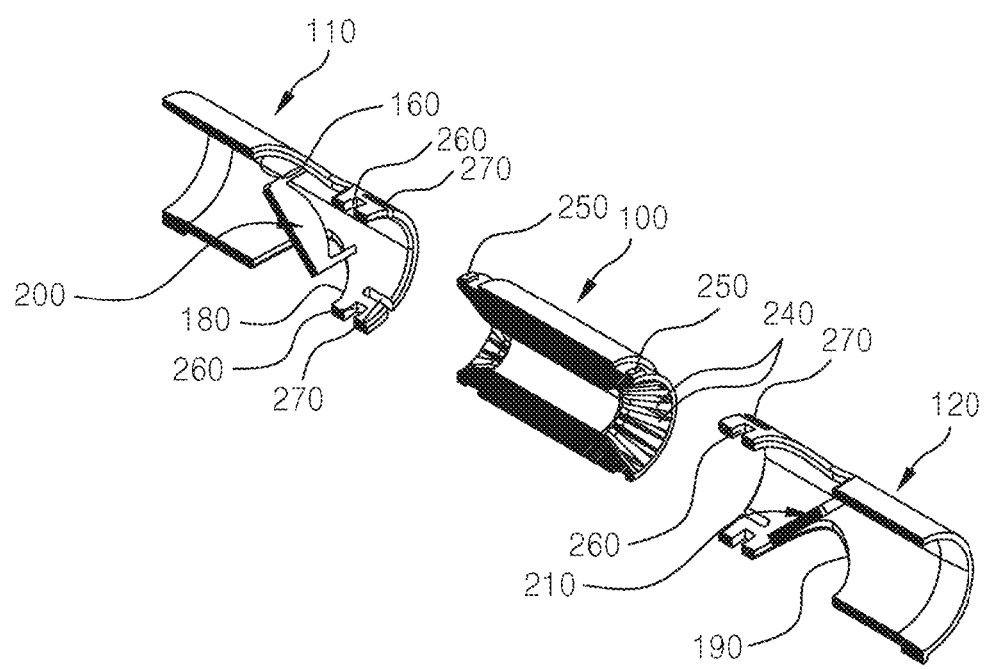
FIG. 9 is a sectional view taken along line A-A of FIG. 8.

FIG. 7 is a front view of the middle tube in the ultrasonic flow meter according to the second embodiment of the present invention, FIG. 8 is a front view of the ultrasonic flow meter according to the embodiment of the present invention, and FIG. 9 is a sectional view taken along line A-A of FIG. 8.

Figure 10:
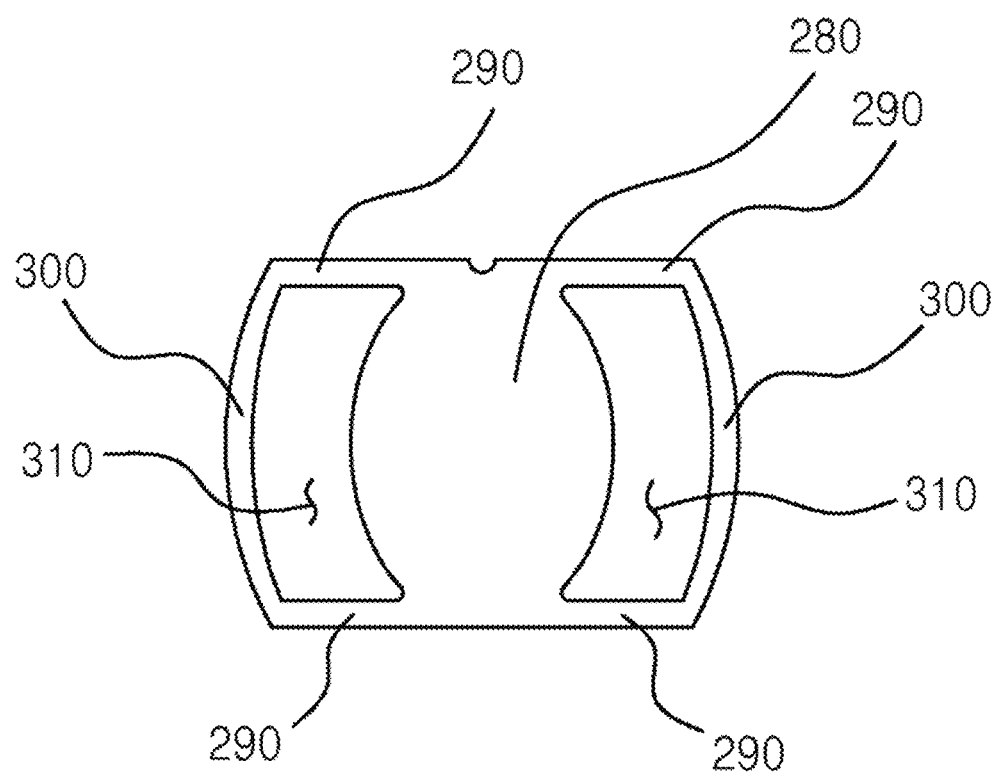
FIG. 10 is a view showing a reflector of the ultrasonic flow meter according to the second embodiment of the present invention.

FIG. 10 is a view showing a reflector of the ultrasonic flow meter according to the second embodiment of the present invention.

Ultrasonic flow meters according to embodiments of the present invention will be described with reference to FIGS. 1 to 9.

An ultrasonic flow meter includes a measurement tube, a flow path sectional area reduction member, and an ultrasonic sensor module (not shown).

A fluid flows along the measurement tube, and the measurement tube includes a pair of sensor holes formed in an outer surface thereof in a state of being spaced apart from each other in a longitudinal direction.

Although not shown in the drawings, the measurement tube is installed in a water pipe (not shown). The outer diameter of the measurement tube may be less than the inner diameter of the water pipe.

Referring to FIGS. 1 to 3, the measurement tube includes a middle tube 100, a first tube 110, and a second tube 120.

As shown in FOGS. 4 to 7, the middle tube 100 has a main flow path defined therein and includes an inner tube 130 formed in the main flow path to allow movement of ultrasonic waves.

The flow path sectional area reduction member is formed between the middle tube 100 and the inner tube 130. Hooks 250 are formed at outer surfaces of opposite sides of the middle tube 100 in the longitudinal direction.

The first tube 110 is installed at one side of the middle tube 100 in the longitudinal direction, and has a first flow path 140 defined therein and a first sensor hole 160 communicating with the first flow path 140. A first reflector 200 is installed in the first flow path 140.

The second tube 120 is installed at the other side of the middle tube 100 in the longitudinal direction, and has a second flow path 150 defined therein and a second sensor hole 170 communicating with the second flow path 150. A second reflector 210 is installed in the second flow path 150.

A hook hole 260 is formed in one side of each of the first tube 110 and the second tube 120 such that a corresponding one of the hooks 250 of the middle tube 100 is coupled thereto.

In addition, incision recesses 270 are formed at opposite sides of the hook hole 260 so as to extend in the longitudinal direction such that the first tube 110 and the second tube 120 can be easily coupled to the middle tube 100.

A first pressure loss reduction hole 180 and a second pressure loss reduction hole 190 are formed at sides of the first tube 110 and the second tube 120 opposite the first sensor hole 160 and the second sensor hole 170, respectively.

The first pressure loss reduction hole 180 and the second pressure loss reduction hole 190 reduce pressure loss of a fluid due to the reflectors when the fluid flows along the first flow path 140, the main flow path, and the second flow path 150.

The first pressure loss reduction hole 180 and the second pressure loss reduction hole 190 may have the same diameters as the first sensor hole 160 and the second sensor hole 170.

The flow path sectional area reduction member regularly reduces the sectional area of the first flow path 140 over at least a predetermined distance between the pair of reflectors in the measurement tube.

The flow path sectional area reduction member includes a plurality of plates 240 disposed such that a plurality of branch flow paths 230 is formed around the inner tube 130 in the longitudinal direction between the pair of reflectors in the measurement tube.

As shown in FIGS. 4 and 5, the plurality of plates 240 is radially disposed in the middle tube 100.

The sectional width of each of the plurality of plates 240 may be gradually decreased from an inner surface of the middle tube 100 in a direction toward the inner tube 130.

In another embodiment, as shown in FIGS. 6 and 7, each of the plurality of plates 240 may be curved from an outer surface of the inner tube 130 in a radial direction.

As shown in FIGS. 4 and 6, the inner tube 130 allows ultrasonic waves to move along a central part thereof such that ultrasonic waves reflected by the reflectors pass through the inner tube. As described above, the plurality of branch flow paths 230 is radially formed around the inner tube 130 to divide some of the fluid flowing along the first flow path 140.

The branch flow paths 230 may be continuously formed in the middle tube 100 over a predetermined distance in the extension direction of the first flow path 140. The predetermined distance may be substantially less than the distance between the first sensor hole 160 and the second sensor hole 170.

The branch flow paths 230 are continuously formed in the extension direction of the first flow path 140, and are formed between the plurality of plates 240 formed on an inner wall of the middle tube 100 so as to protrude.

In addition, as shown in FIG. 9, both ends of each of the plurality of plates 240 in the longitudinal direction may be rounded. Since both ends in the longitudinal direction are rounded, it is possible to achieve an effect in that the fluid introduced into the first flow path 140 is guided to the inner tube 130.

As shown in FIGS. 5 and 7, the inner tube 130 is formed between the plurality of plates 240 formed in the first flow path 140 so as to face each other, and the width of a central flow path 220 defined in the inner tube 130 may be equal to or slightly less than the width of each of the reflectors.

The first reflector 200 and the second reflector 210 are located respectively in the first tube 110 and the second tube 120 so as to face each other in an inclined state under the ultrasonic sensor module.

Referring to FIG. 10, each of the first reflector 200 and the second reflector 210 includes a reflecting portion 280 and burying portions 300. The reflecting portion 280 is made of a metal material, Since the ultrasonic flow meter is mainly used to measure the usage amount of water for water supply, the reflecting portion may be made of a material that is not eroded by water, such as stainless steel or brass.

The burying portions 300 are formed at opposite sides of the reflecting portion 280. A plurality of connecting portions 290 is provided to connect upper parts of the reflecting portion 280 and the burying portions 300 to each other and to connect lower parts of the reflecting portion 280 and the burying portions 300 to each other. Through-holes 310 are formed between the plurality of connecting portions 290.

As shown in FIG. 10, each of the burying portions 300 is round. Since the curvature of each burying portion 300 is equal to the curvature of the circumference of the section of a corresponding one of the first tube 110 and the second tube 120 when the reflectors are located inclined at a predetermined angle in the first tube 110 and the second tube 120, the burying portions may be formed by insert injection molding without being exposed out of the first tube 110 and the second tube 120.

A process in which the ultrasonic flow meter according to the embodiment of the present invention measures the flow speed of the fluid through the pair of ultrasonic transducers 290 is already known from KR 10-2189806 B1, and therefore a detailed description thereof will be omitted for simplicity of description.

Table 1 shows the results of simulation of the flow of a fluid in the central flow path and the branch flow paths of the measurement tube according to the embodiment of the present invention.

TABLE 1

| Flow rate (l/h) | Flow speed (mm/s) | Reynolds number in central flow path | Reynolds number in branch flow paths |
|---|---|---|---|
| 2 | 1.05 | 84 | 1 |
| 5 | 2.62 | 197 | 4 |
| 8 | 4.19 | 309 | 8 |
| 10 | 5.23 | 378 | 11 |
| 16 | 8.37 | 567 | 21 |
| 50 | 26.16 | 1526 | 95 |
| 83.27 | 34.05 | 2100 | 206 |
| 100 | 52.32 | 2746 | 223 |
| 200 | 104.64 | 4990 | 501 |
| 500 | 261.6 | 11282 | 1380 |
| 740.27 | 387.3 | 15182 | 2100 |
| 1000 | 523.19 | 21421 | 2878 |
| 2500 | 1307.98 | 50894 | 7474 |
| 3125 | 1634.97 | 60323 | 9769 |
| 4000 | 2092.77 | 79877 | 12132 |
| 5000 | 2615.96 | 98370 | 15321 |
| 6177.79 | 3232.17 | 119953 | 19117 |
| 7267.99 | 3802.55 | 139472 | 22688 |

In Table 1, the flow speed is the average flow speed of the fluid introduced into the measurement tube.

It is known that, when the flow of a fluid in a pipe has a Reynolds number of less than 2100, the flow is laminar flow. In Table 1, therefore, it can be seen that, when the Reynolds number in the central flow path is 2100 or more, the flow in the central flow path is turbulence. Similarly, it can be seen that, when the Reynolds number in the branch flow paths is 2100 or more, the flow in the branch flow paths is also turbulence.

Referring to FIG. 1, therefore, in the measurement tube according to this embodiment, when the flow rate is 83.27 l/h and the flow speed is 34.05 mm/s, the flow of the fluid in the central flow path may be converted into turbulence, and when the flow rate is 740.27 l/h and the flow speed is 387.3 mm/s, the flow of the fluid in the branch flow paths may be converted into turbulence.

Figure 11:
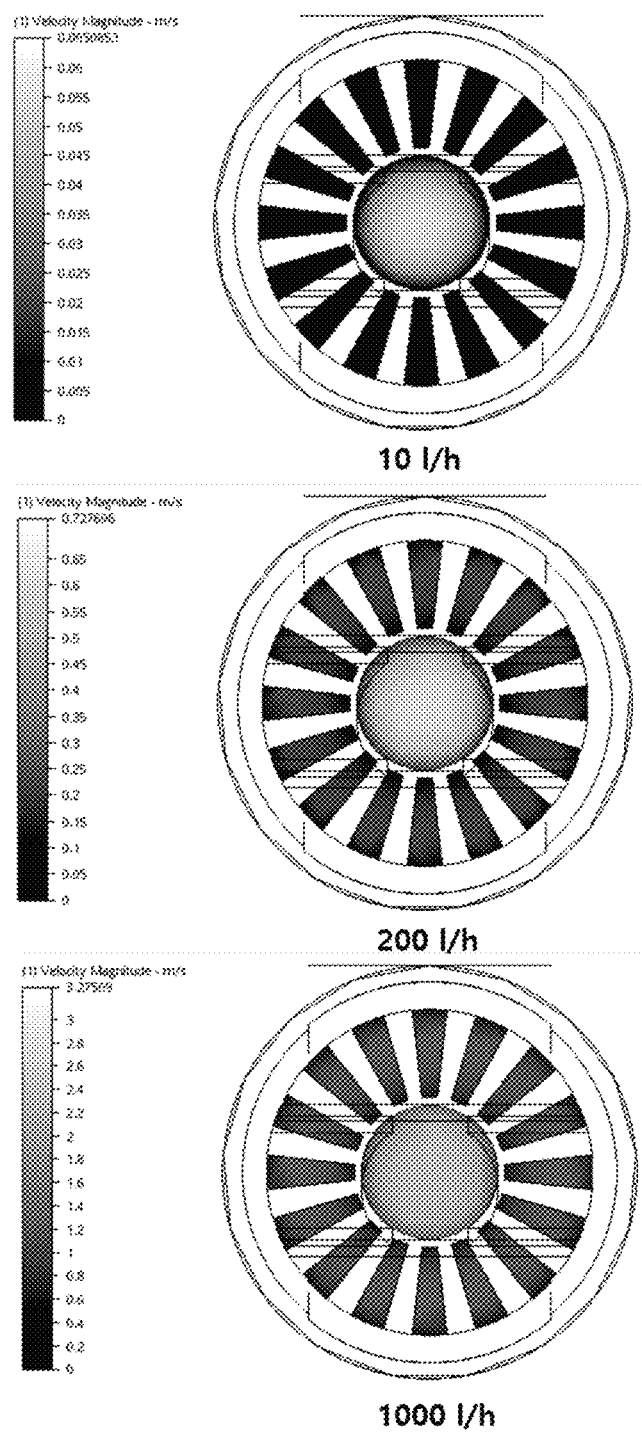
FIG. 11 is a view showing distribution of the flow speed in a central flow path and branch flow paths of the ultrasonic flow meter according to the embodiment of the present invention.
Figure 12:
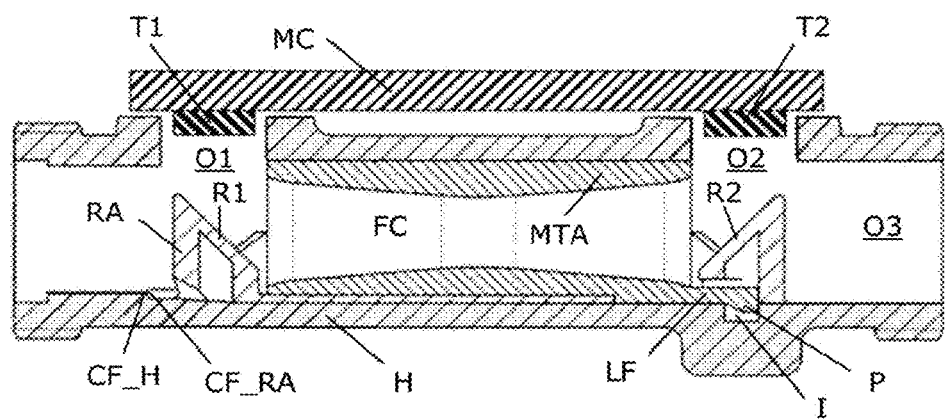
FIG. 12 is a view showing a flow channel of a conventional ultrasonic flow meter.

Meanwhile, FIG. 11 shows distribution of the flow speed in the central flow path and the branch flow paths when the flow rate is 10 l/h (left), 200 l/h (middle), and 1000 l/h (right), among the above results of simulation.

When the flow rate is 10 l/h, the Reynolds number in the branch flow paths as well as the central flow path is 2100 or less, and therefore the flow of the fluid is laminar flow. In this case, as shown in FIG. 8, it can be seen that the fluid mainly flows through the central flow path and the fluid is stagnant in branch flow paths. That is, when the fluid flows at a low speed, the branch flow paths behave as though closed. As a result, the fluid flows almost through the central flow path, and therefore the flow speed in the central flow path is higher than when no branch flow paths are provided.

When the flow rate is 200 l/h, the flow in the central flow path is turbulence, whereas the flow in the branch flow paths is laminar flow. In this case, as shown in FIG. 8, it can be seen that the flow speed in the branch flow paths is increased but not greatly increased, and the flow speed in the central flow path is further increased, as compared to when the flow rate is 10 l/h.

When the flow rate is 1000 l/h, the flow in both the central flow path and the branch flow paths is turbulence. In this case, as shown in FIG. 8, it can be seen that the flow concentrated on the central flow path widely extends to the branch flow paths, whereby the flow speed in the branch flow paths is considerably increased. The branch flow paths are closed at a low flow speed, but a considerable amount of fluid also flows through the branch flow paths when the flow speed is increased, whereby pressure reduction in the measurement tube is prevented.

That is, the branch flow paths are closed at a low flow speed, whereby the flow of the fluid is concentrated on the central flow path, and therefore the flow speed in the central flow path is increased. At a high flow speed, a considerable amount of fluid flows through the branch flow paths, whereby pressure reduction in the measurement tube is prevented.

The flow speed in the branch flow paths when the flow is converted into turbulence may be set depending on design, and the branch flow paths may be designed based on the set flow speed. For example, the shape, size, and number of plates forming the branch flow paths may be set depending on the flow speed for conversion into turbulence.

For example, the flow speed at the introduction side of the measurement tube for conversion into turbulence in the branch flow paths is 34.05 mm/s or more, preferably 1000 mm/s or less.

As is apparent from the above description, the present invention has an effect in that, when a low-flow-rate fluid passes through a flow path between reflectors, the low-flow-rate fluid passes only through an inner tube while the fluid between plates is stagnant, whereby it is possible to improve accuracy in ultrasonic flow rate measurement.

Effects obtainable from the present invention are not limited by the above mentioned effects, and other unmentioned effects can be clearly understood from the above description by those having ordinary skill in the technical field to which the present invention pertains.

Although embodiments have been described above, the embodiments are merely illustrations and do not limit the present invention, and those skilled in the art will appreciate that various modifications and applications are possible without departing from the intrinsic features of the disclosure. For example, concrete constituent elements of the embodiments may be modified. In addition, it is to be u understood that differences relevant to the modifications and the applications fall within the scope of the present invention defined in the appended claims.

What is claimed is:

1. An ultrasonic flow meter comprising:
   a measurement tube having formed therein a main flow path configured to allow a fluid to flow therein, the measurement tube having a first sensor hole and a second sensor hole;
   an ultrasonic sensor module comprising a first ultrasonic transducer installed in the first sensor hole and a second ultrasonic transducer installed in the second sensor hole;
   a first reflector and a second reflector installed in the measurement tube so as to correspond to the first sensor hole and the second sensor hole, respectively; an inner tube located at a center of the main flow path, the inner tube having formed therein a central flow path configured to allow movement of ultrasonic waves therethrough; and
   a flow path sectional area reduction member configured to reduce a sectional area of the main flow path over at least a predetermined distance in an extension direction of the main flow path between the first reflector and the second reflector, the flow path sectional area reduction member comprising a plurality of plates disposed such that a plurality of branch flow paths is formed around the inner tube.

2. The ultrasonic flow meter according to claim 1, wherein the measurement tube comprises:
   a middle tube having the main flow path defined therein;
   a first tube coupled to one side of the middle tube, the first tube having formed therein a first flow path connected to the main flow path, the first tube being provided in an outer surface thereof with a first sensor hole communicating with the first flow path; and
   a second tube coupled to the other side of the middle tube, the second tube having formed therein a second flow path connected to the main flow path, the second tube being provided in an outer surface thereof with a second sensor hole communicating with the second flow path.

3. The ultrasonic flow meter according to claim 2, wherein the plurality of plates connects an outer surface of the inner tube and an inner surface of the middle tube to each other.

4. The ultrasonic flow meter according to claim 1, wherein the plurality of plates is disposed in a second direction perpendicular to an extension direction of the main flow path.

5. The ultrasonic flow meter according to claim 2, wherein the plurality of plates is configured such that a sectional width of each of the plurality of plates is gradually decreased from an inner surface of the middle tube to the inner tube.

6. The ultrasonic flow meter according to claim 1, wherein both ends of each of the plurality of plates in a longitudinal direction are rounded.

7. The ultrasonic flow meter according to claim 1, wherein each of the first and second reflectors comprises:
   a reflecting portion;
   burying portions formed at opposite sides of the reflecting portion; and
   a plurality of connecting portions configured to connect the reflecting portion and the burying portions to each other.

8. The ultrasonic flow meter according to claim 7, wherein each of the burying portions has the same curvature as a circumference of a section of a corresponding one of the first tube and the second tube when the reflectors are located inclined at a predetermined angle in the first tube and the second tube.

9. The ultrasonic flow meter according to claim 7, wherein the burying portions of each of the first and second reflectors are located in a corresponding one of the first tube and the second tube by insert injection molding.

10. The ultrasonic flow meter according to claim 1, wherein each of the plurality of plates is curved.

11. The ultrasonic flow meter according to claim 2, wherein the middle tube is provided at each of outer surfaces of opposite sides thereof in the longitudinal direction with at least one hook, and each of the first and second tubes is provided at one side thereof with a hook hole configured to allow the hook to be coupled thereto.

12. The ultrasonic flow meter according to claim 11, wherein each of the first and second tubes is provided at opposite sides of the hook hole thereof with incision recesses extending in the longitudinal direction.

13. The ultrasonic flow meter according to claim 1, wherein the first tube and the second tube are provided at sides thereof opposite the first and second sensor holes with first and second pressure loss reduction holes, respectively.

14. The ultrasonic flow meter according to claim 2, wherein the plurality of plates is radially disposed between the inner tube and the middle tube.

15. The ultrasonic flow meter according to claim 1, wherein the plurality of branch flow paths is configured such that, when a flow speed of the fluid introduced into the measurement tube is a value between 34.05 and 1000 mm/s, a Reynolds number in each of the branch flow paths is 2100.

* * * * *